(12) United States Patent
Cowsar et al.

(10) Patent No.: US 6,285,372 B1
(45) Date of Patent: Sep. 4, 2001

(54) MULTIRESOLUTION ADAPTIVE PARAMETERIZATION OF SURFACES

(76) Inventors: Lawrence C. Cowsar, 390 Morris Ave., Summit, NJ (US) 07901; David Dobkin, 24 Hibben Rd., Princeton, NJ (US) 08540; Aaron W. F. Lee, 301 Chetwood Dr., Mountain View, CA (US) 94043; Peter Schröder, 1111 Blanche St., No. 201, Pasadena, CA (US) 91106; Wim Sweldens, 29 Morehouse Pl., New Providence, NJ (US) 07974

( * ) Notice: Subject to any disclaimer, the term of this patent is extended or adjusted under 35 U.S.C. 154(b) by 0 days.

(21) Appl. No.: 09/075,303

(22) Filed: May 8, 1998

(51) Int. Cl.[7] .................................................. G06T 15/20
(52) U.S. Cl. ........................................... 345/425; 345/420
(58) Field of Search ..................................... 345/420, 425

(56) References Cited

U.S. PATENT DOCUMENTS

| 5,602,979 | * | 2/1997 | Loop | 345/423 |
| 5,966,133 | * | 10/1999 | Hoppe | 345/420 |

OTHER PUBLICATIONS

Canales et al., "An Adaptive Mesh Refinement Procedure for Shape Optimal Design", 1994.*
H. Hoppe, "Progressive meshes," in Computer Graphics (SIGGRAPH '96 Proceedings), pp. 99–108, 1996.
P. S. Heckbert and M. Garland, "Survey of polygonal surface simplification algorithms," Tech. rep., Carnegie Mellon University, 1997.
V. Krishnamurthy and M. Levoy, "Fitting smooth surfaces to dense polygon meshes," in Computer Graphics, (SIGGRAPH '96 Proceedings), pp. 313–324, 1996.
M. Eck et al., "Multiresolution analysis of arbitrary meshes," in Computer Graphics (SIGGRAPH '95 Proceedings), pp. 173–182, 1995.
J.C. Xia and A. Varshney, "Dynamic view–dependent simplification for polygonal models," in Proceedings of Visualization '96, pp. 327–334, Oct. 1996.
H. Hoppe, "View–dependent refinement of progressive meshes," in Computer Graphics (SIGGRAPH '97 Proceedings), pp. 189–198, 1997.
A. Certain et al., "Hierarchical computation of PL harmonic embeddings," Tech. Rep., University of Washington, Jul. 1997.
M. Garland and P.S. Heckbert, "Fast polygonal approximation of terrains and height fields," Tech. Rep. CMU–CS–95–181, CS Dept., Carnegie Mellon U., Sep. 1995.

* cited by examiner

*Primary Examiner*—Lance W. Sealey
(74) *Attorney, Agent, or Firm*—Ryan, Mason & Lewis, LLP

(57) ABSTRACT

An irregular connectivity mesh representative of a surface having an arbitrary topology is processed to generate a parameterization which maps points in a coarse base domain to points in the mesh. An illustrative embodiment uses a multi-level mesh simplification process in conjunction with conformal mapping to efficiently construct a parameterization of a mesh comprising a large number of triangles over a base domain comprising a smaller number of triangles. The parameterization in this embodiment corresponds to the inverse of function mapping each point in the original mesh to one of the triangles of the base domain, such that the original mesh can be reconstructed from the base domain and the parameterization. The mapping function is generated as a combination of a number of sub-functions, each of which relates data points in a mesh of one level in a simplification hierarchy to data points in a mesh of the next coarser level of the simplification hierarchy. The parameterization can also be used to construct, from the original irregular connectivity mesh, an adaptive remesh having a regular connectivity which is substantially easier to process than the original mesh.

24 Claims, 11 Drawing Sheets

Original mesh (level 14)

Intermediate mesh (level 6)

Coarsest mesh (level 0)

MULTIRESOLUTION ADAPTIVE PARAMETERIZATION OF SURFACES

GOVERNMENT RIGHTS

The U.S. Government has certain rights in this invention pursuant to Grant Nos. ACI 9624-957, ACI 9721-349 and DMS 9874082 awarded by the National Science Foundation.

FIELD OF THE INVENTION

The present invention relates generally to techniques for processing data representative of surfaces having an arbitrary topology, and more particularly to processing techniques which utilize a mesh of interconnected data points to characterize a surface in three or more dimensions.

BACKGROUND OF THE INVENTION

Dense meshes of interconnected data points are used to represent surfaces of arbitrary topology in numerous applications. For example, such meshes routinely result from three-dimensional data acquisition techniques such as laser range scanning and magnetic resonance volumetric imaging. These meshes are often configured in the form of a large number of triangles, and typically have an irregular connectivity, i.e., the vertices of the mesh have different numbers of incident triangles. Because of their complex structure and potentially tremendous size, dense meshes of irregular connectivity are difficult to handle in such common processing tasks as storage, display, editing, and transmission.

It is known that multiresolution representations of dense meshes can be used to facilitate these processing tasks. One approach to constructing multiresolution representations extends classical multiresolution analysis and subdivision techniques to arbitrary topology surfaces, as described in, for example, M. Lounsbery et al., "Multiresolution analysis for surfaces of arbitrary topological type," Transactions on Graphics 16:1, pp. 34–73, January 1997, and D. Zorin et al., "Interpolating subdivision for meshes with arbitrary topology," in Computer Graphics (SIGGRAPH '96 Proceedings), pp. 189-192, 1996. Another more general approach is based on sequential mesh simplification, e.g., progressive meshes (PM), as described in, for example, H. Hoppe, "Progressive meshes," in Computer Graphics (SIGGRAPH '96 Proceedings), pp. 99–108, 1996. Additional mesh simplification techniques are described in P. S. Heckbert and M. Garland, "Survey of polygonal surface simplification algorithms," Tech. rep., Carnegie Mellon University, 1997.

In both classical multiresolution analysis and mesh simplification, the basic objective is generally to represent meshes in an efficient and flexible manner, and to use this representation in algorithms which address the processing challenges mentioned above. An important element in the design of such algorithms is the construction of "parameterizations," i.e., functions mapping points on a coarse "base domain" mesh to points on a finer original mesh. Once a surface is characterized in this manner, as a function between a base domain and a space of three or more dimensions, many techniques from fields such as approximation theory, signal processing, and numerical analysis may be used to process data representing the surface.

A conventional approach to building parameterizations for meshes representing surfaces of arbitrary topology is based on approximation of a set of samples, as described in, for example, V. Krishnamurthy and M. Levoy, "Fitting smooth surfaces to dense polygon meshes," in Computer Graphics, (SIGGRAPH '96 Proceedings), pp. 313–324, 1996. A significant drawback of this type of approach is that the number of triangles in the base domain depends heavily on the geometric complexity of the surface to be characterized. Another problem is that the user may be required to define the entire base domain rather than only selected features. Additionally, in conventional remeshing techniques that work from coarse to fine mesh levels, it is possible for the procedure to "latch" onto the wrong surface in regions of high curvature.

Another conventional approach to building parameterizations for surfaces of arbitrary topology is based on remeshing an existing mesh with the goal of applying classical multiresolution analysis. A technique implementing this approach is described in M. Eck et al., "Multiresolution analysis of arbitrary meshes," in Computer Graphics (SIGGRAPH '95 Proceedings), pp. 173–182, 1995. A problem with algorithms of this type is that processing run times can be long because a large number of harmonic map computations are involved. Although this problem can be alleviated by reducing the harmonic map computations through hierarchical preconditioning, other problems remain. For example, there is generally no explicit control over the number of triangles in the base domain or the placement of boundaries. In addition, these and other remeshing algorithms typically generate only uniformly subdivided meshes which are subsequently made sparser through wavelet thresholding methods. Many extra subdivided levels may be needed to resolve one small local feature, and each additional level approximately quadruples the amount of computation and storage required to process the resulting mesh. This can lead to the intermediate construction of many more triangles than were contained in the original mesh, which unduly complicates the mesh processing operations.

SUMMARY OF THE INVENTION

The present invention provides techniques for generating parameterizations of irregular connectivity meshes representing surfaces of arbitrary topology. An illustrative embodiment uses multi-level mesh simplification in conjunction with conformal mapping to efficiently construct a parameterization of an original mesh comprising a large number of triangles over a base domain comprising a smaller number of triangles. The parameterization in the illustrative embodiment corresponds to the inverse of a function mapping each point in the original mesh to one of the triangles of the base domain, such that the original mesh can be reconstructed from the base domain and the parameterization. The mapping function is generated as a combination of a number of sub-functions, each of which relates data points in a mesh of one level in a simplification hierarchy to data points in a mesh of the next coarser level of the simplification hierarchy. An initial parameterization constructed in this manner can be further improved through a hierarchical smoothing procedure applied in the parameter domain so as to produce a smooth parameterization of high visual and numerical quality.

The procedure for generating the parameterization can be made fully automatic, but also allows for user intervention in the form of, for example, specifying point or path features in the original mesh such that a corresponding feature in the base domain maps exactly to the specified feature in the original mesh. Although a parameterization constructed in accordance with the invention is particularly well suited for use in remeshing applications, it is also useful in a wide variety of other applications, including, for example, multiresolution editing, texture mapping and morphing.

In accordance with another aspect of the invention, a remeshing process is provided which utilizes the above-described parameterization to convert an irregular connectivity mesh of arbitrary topology into a regular connectivity mesh meeting specified error bounds. The remeshing process may be made adaptive by computing error values for each of the triangles of the base domain, and subdividing any base domain triangles which have an error value above a specified threshold. The error computing and subdividing operations are then repeated until all of the triangles of the adaptive mesh represent the original mesh data points within the specified error bounds. Unlike conventional remeshing techniques, the remeshing of the present invention can directly construct an adaptively subdivided mesh, thereby avoiding the excessive computation and storage costs associated with the conventional approach of uniform subdivision followed by sparsification.

DETAILED DESCRIPTION OF THE INVENTION

The present invention will be illustrated below in conjunction with exemplary processing techniques applied to three-dimensional surface data in the form of meshes of triangles. It should be understood, however, that the disclosed techniques are suitable for use with a wide variety of other representations of surface data and in numerous other applications. For example, the invention can be applied to surface data in forms other than a mesh of triangles, and can be applied to surface data of more than three dimensions. The term "mesh" as used herein refers to any set of interconnected data points which is representative of a surface. The term "parameterization" as used herein refers to any function or set of functions which specifies a mapping between at least a portion of the data points in one mesh and data points in at least one other mesh that is less coarse. A "smooth parameterization" refers to a parameterization which has been subject to a smoothing operation.

Figure 1A:
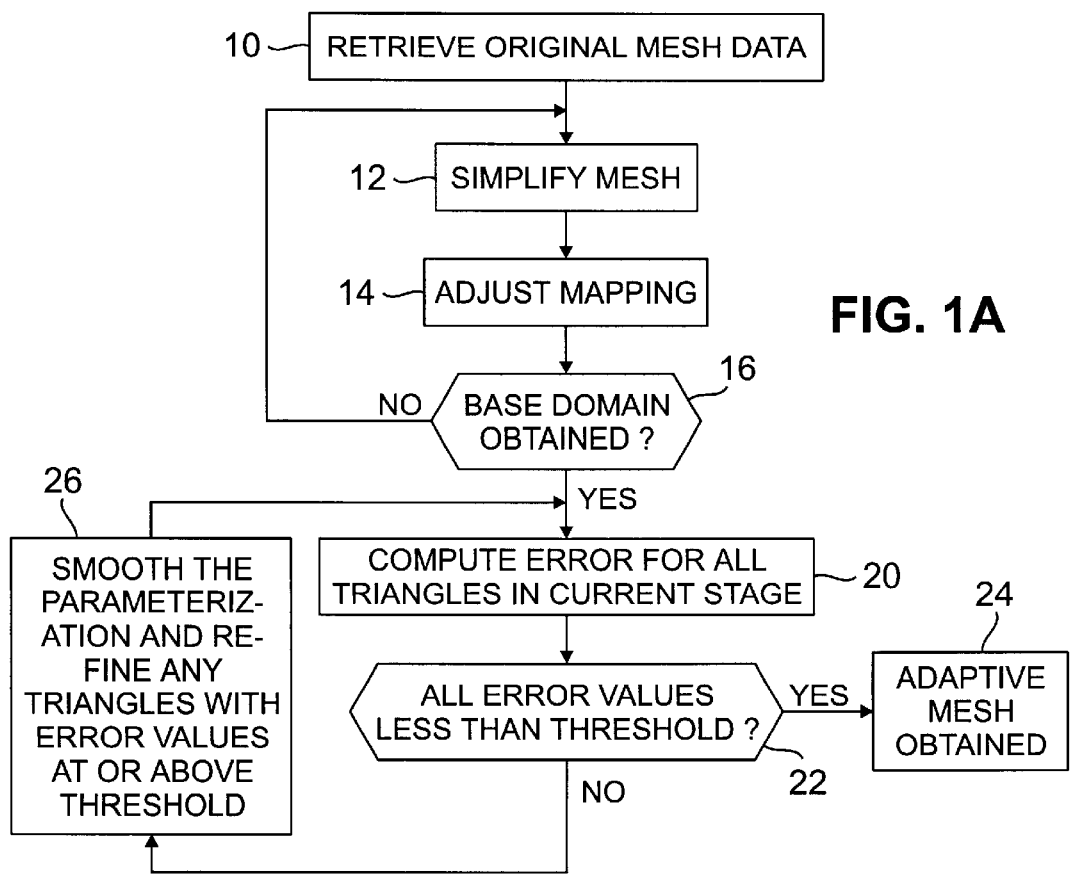
FIG. 1A is a flow diagram illustrating a method for processing surface data in accordance with the invention.

FIG. 1A is a flow diagram illustrating an overview of a process in accordance with one possible embodiment of the invention. The process generates a smooth parameterization of a mesh representing a surface of arbitrary topology, and utilizes the parameterization to perform adaptive remeshing, i.e., to create an adaptive retriangulation of the original mesh. The process begins in step 10 with retrieval of data corresponding to an original mesh. It is assumed without limitation that the original mesh is a mesh of triangles having an irregular connectivity, i.e, the vertices of the mesh have different numbers of incident triangles. A base domain is obtained for the original mesh using steps 12, 14 and 16. In step 12, the original mesh is simplified using techniques such as vertex and edge removal followed by retriangulation, as will be described in greater detail below. In step 14, a mapping function is constructed which assigns every vertex from the original mesh to a triangle in a corresponding mesh simplification level. Although illustrated as sequential steps in FIG. 1A, it should be understood that the mesh simplification and mapping steps 12 and 14 are generally carried out concurrently, as will be described in greater detail below. Step 16 determines if a base domain has been obtained to a desired resolution. If the base domain has not yet been obtained to the desired resolution, the mesh simplification and mapping steps 12 and 14 are repeated until the base domain is obtained to the desired resolution.

Steps 20 through 26 illustrate the manner in which the parameterization obtained in steps 12 through 16, i.e., the mapping function and the base domain, can be used to perform remeshing operations. In step 20, error values are computed for each of the triangles in a current stage of retriangulation. For the initial pass through step 20, the current stage is the base domain itself. The error values may be computed by, for example, summing the distance between each of the data points in the original mesh to the corresponding triangle in the current stage. The error value for a given triangle in the current stage thus provides an indication of how well that triangle represents the original mesh data points which are mapped onto it. In step 22, the parameterization is smoothed, if necessary, and error values for the triangles of the current stage are each compared to a threshold. If the error value for a given current stage triangle equals or exceeds the threshold, that triangle is refined by, for example, adaptively subdividing it into additional triangles so as to better represent the original mesh data points. The error computations in step 20 are then repeated, and the refinement process continues until each of the remaining triangles has an error value which is less than the threshold. The resulting adaptive mesh can be made to have a regular connectivity, and is suitable for use in such applications as multiresolution editing, texture mapping and morphing.

The above illustrative process uses a mesh simplification strategy to define the base domain. The process proceeds from fine to coarse, thereby avoiding correspondence problems associated with conventional techniques which proceed from coarse to fine. In addition, if smoothing is used, derivative discontinuities at the edges of the base domain can be avoided. As will be described below, the process also supports vertex and edge tags to constrain the resulting parameterization to align with selected features of the original mesh without requiring the user to specify the entire base domain.

Figure 1B:
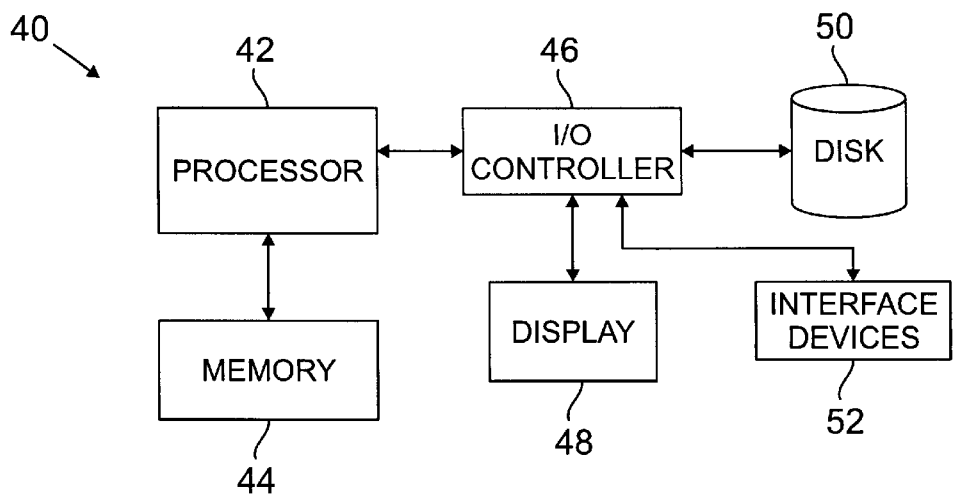
FIG. 1B is a block diagram of a system for processing surface data in accordance with the invention.

FIG. 1B shows an exemplary system 40 in which the process of FIG. 1B can be implemented. The system 40 includes a processor 42 coupled to a memory 44 and an input/output (I/O) controller 46. The I/O controller 46 in conjunction with the processor 42 directs the operation of a number of peripheral components including a display 48, a disk-based storage device 50 and one or more interface devices 52 which may include, for example, a printer, a keyboard and a network interface card. The elements 42, 44, 46, 48, 50 and 52 of system 40 may represent portions of a desktop or portable personal computer, a microcomputer, a workstation, a mainframe computer or other type of digital data processor. The memory 44 and disk-based storage device 50 may be electronic, magnetic or optical storage devices.

The present invention may be implemented at least in part in the form of a computer software program stored in memory 44 or storage device 50. For example, such a program may be executed by processor 42 on input mesh data to produce a desired output mesh in a predetermined format on display 48. The program may be written in a conventional programming language such as C++ and may make use of standard computational geometry data structures such as those described in, for example, E. P. Mucke, "Shapes and implementations in three-dimensional geometry," Techn. Rep. UIUCDCS-R-93-1836, University of Illinois at Urbana-Champaign, 1993. The input mesh data may be read from one or more files of disk-based storage device 50, or transmitted to the system 40 over a network connection such as, for example, an Ethernet connection or other suitable local area network (LAN) connection.

The mesh simplification and mapping aspects of the invention will now be described in greater detail. When describing surfaces mathematically, it is useful to separate the topological and geometric information. To this end, the following notation is presented, based on that described in E. H. Spanier, "Algebraic Topology," McGraw-Hill, New York, 1966. A triangular mesh is denoted as a pair (P, K), where P is a set of N point positions $p_i=(x_i, y_i, z_i) \in R^3$ with $1 \leq i \leq N$, and K is an abstract simplicial complex which contains all the topological, i.e., adjacency information in the mesh. The complex K is a set of subsets of $\{1, \ldots, N\}$. These subsets are called simplices and come in three types: vertices $v=\{i\} \in K$, edges $e=\{i, j\} \in K$, and faces $f=\{i, j, k\} \in K$, so that any non-empty subset of a simplex of K is again a simplex of K, e.g., if a face is present so are its edges and vertices.

Let $e_i$ denote the standard i-th basis vector in $R^N$. For each simplex s, its topological realization |s| is the strictly convex hull of $\{e_i | i \in s\}$. Thus $|\{i\}|=e_i$, $|\{i, j\}|$ is the open line segment between $e_i$ and $e_j$, and $|\{i, j, k\}|$ is an open equilateral triangle. The topological realization |K| is defined as $\mathring{A}(s \in K) |s|$. The geometric realization $\phi|K|$ relies on a linear map $\phi$: $R^N \rightarrow R^3$ defined by $\phi(e_i)=p_i$. The resulting polyhedron consists of points, segments, and triangles in $R^3$. Two vertices $\{i\}$ and $\{j\}$ are neighbors if $\{i, j\} \in K$. A set of vertices is "independent" if no two vertices are neighbors. A set of vertices is "maximally independent" if no larger independent set contains it (e.g., see FIG. 3, left side). A "1-ring neighborhood" of a vertex $\{i\}$ is the set $$N(i)=\{j | \{i,j\} \in K\}.$$

An "outdegree" $K_i$ of a vertex $\{i\}$ is its number of neighbors. The "star" of a vertex $\{i\}$ is the set of simplices $$star(i) = \bigcup_{i \in s, s \in K} s.$$

We say that |K| is a two-dimensional manifold (i.e., a 2-manifold) with boundaries if for each i, |star (i)| is homeomorphic to a disk (interior vertex) or half-disk (boundary vertex) in $R^2$. An edge $e=\{i,j\}$ is called a boundary edge if there is only one face f with $e \subset f$. We define a conservative curvature estimate, $\kappa(i)=|\kappa_1|+|\kappa_2|$ at $p_i$, using the principal curvatures $\kappa_1$ and $\kappa_2$. These are estimated by a standard procedure of first establishing a tangent plane at $p_i$ and then using a second degree polynomial to approximate $\phi(|star(i)|)$.

Mesh Hierarchies

The mesh simplification step of the algorithm illustrated in FIG. 1A involves the construction of a mesh hierarchy. An original mesh $(P, K)=(P^L, K^L)$ is successively simplified into a series of homeomorphic meshes $(P^l, K^l)$ with $0 \leq l \leq L$, where $(P^0, K^0)$ is the coarsest or base domain mesh (see FIG. 4). A known technique for implementing this mesh simplification is known as progressive meshes (PM) and is described in H. Hoppe, "Progressive meshes," in Computer Graphics (SIGGRAPH '96 Proceedings), pp. 99–108, 1996. In the conventional PM approach, the basic operation is an "edge collapse." A linear sequence of these basic operations is prioritized based on approximation error. The linear sequence of edge collapses can be partially ordered based on topological dependence, which defines levels in a hierarchy, as described in J. C. Xia and A. Varshney, "Dynamic view-dependent simplification for polygonal models," in Proceedings of Visualization '96, pp. 327–334, October 1996, and H. Hoppe, "View-dependent refinement of progressive meshes," in Computer Graphics (SIGGRAPH '97 Proceedings), pp. 189–198, 1997.

Alternative mesh simplification approaches may utilize a "vertex remove" as a basic operation. For example, an approach described in D. Dobkin and D. Kirkpatrick, "A linear algorithm for determining the separation of convex polyhedra," Journal of Algorithms 6, pp. 381–392, 1985, utilizes a vertex remove operation followed by retriangulation of the resulting hole. This approach is referred to as the DK algorithm. It has been shown that the number of levels L in a mesh hierarchy constructed using the DK algorithm is on the order of log N. It should be noted that the two basic operations "edge collapse" and "vertex remove" are related since an edge collapse into one of its endpoints corresponds to a vertex remove with a particular retriangulation of the resulting hole.

Figures 2A, 2B, 2C:
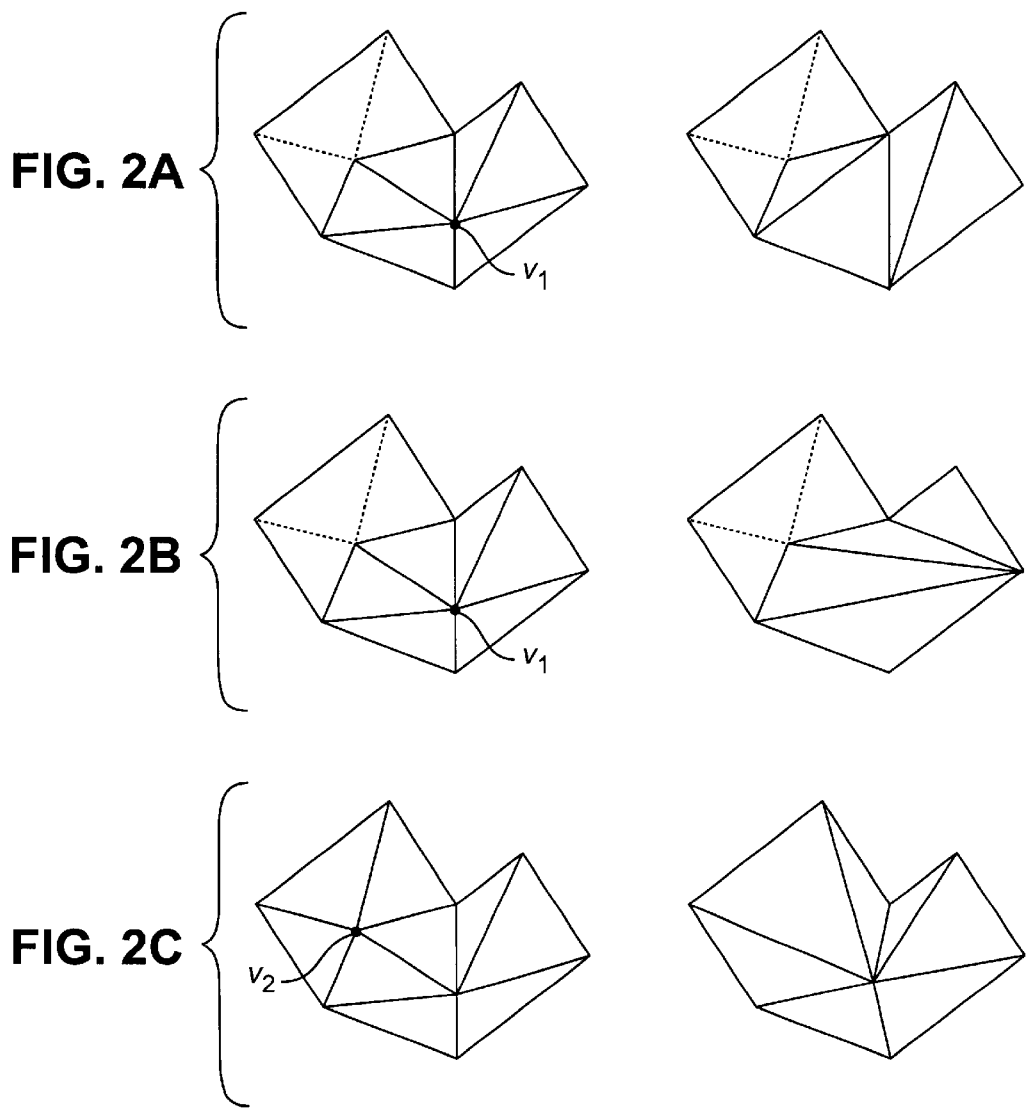
FIGS. 2A–2C show examples of different mesh simplification operations which may be utilized in conjunction with the invention.

FIGS. 2A, 2B and 2C illustrate a number of the basic operations described above, as applied to an exemplary portion of a mesh. In each of FIGS. 2A, 2B and 2C, the left side shows the mesh before the operation and the right side shows the mesh after the operation. FIG. 2A illustrates the removal of a vertex $v_1$ followed by a retriangulation. FIG. 2B illustrates a half-edge collapse operation which results in the removal of vertex $v_1$. FIG. 2C illustrates a general edge collapse operation which results in the removal of vertex $v_2$. Although the invention will be illustrated below using a mesh simplification approach based on vertex remove operations, it should be understood that the invention can also be implemented using the above-noted PM techniques as well as other types of mesh simplification. Other aspects of hierarchical-based mesh simplification are described in T. Duchamp, "Hierarchical computation of PL harmonic embeddings," Tech. Rep., University of Washington, July 1997.

Vertex Removal

Figure 3:
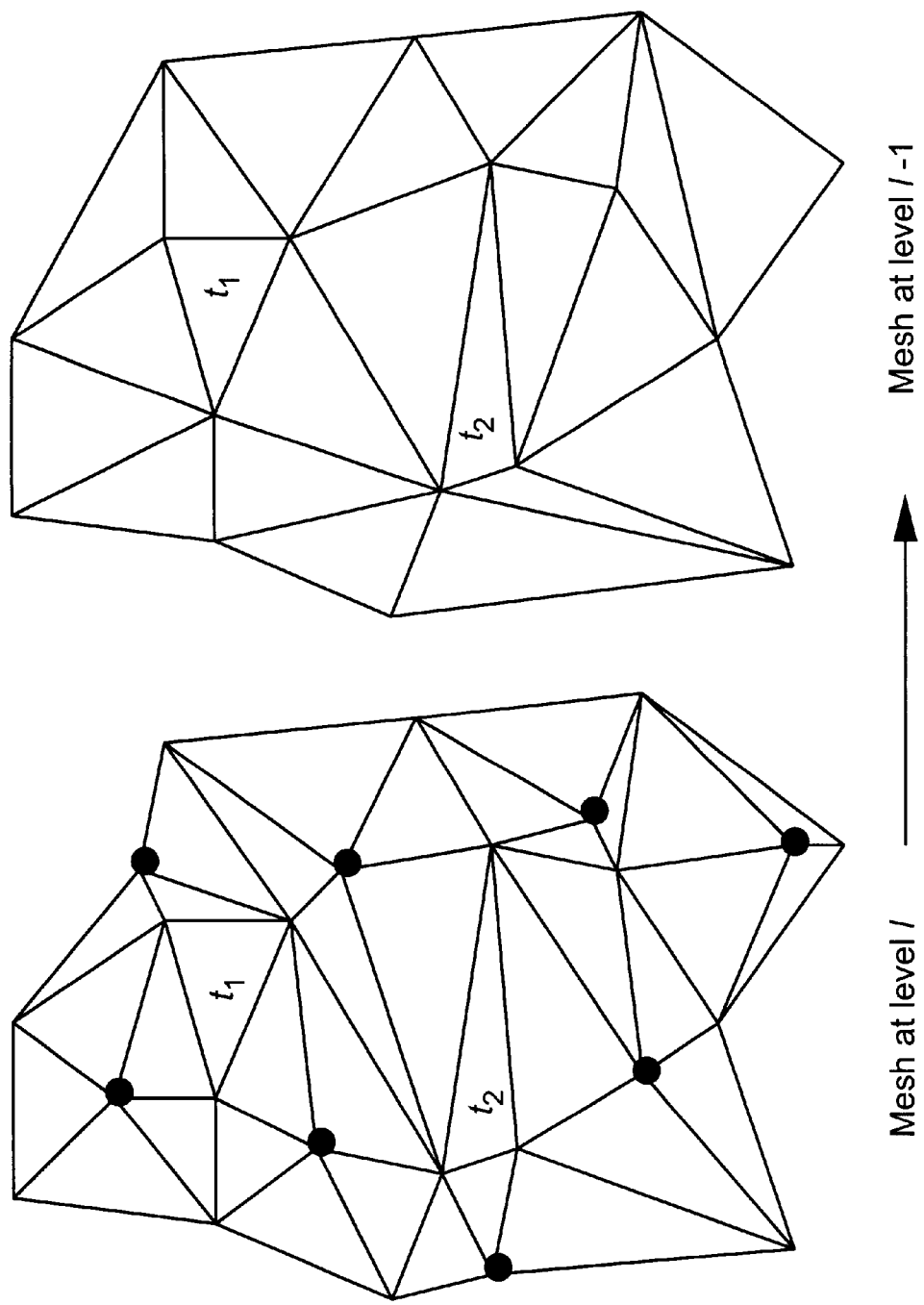
FIG. 3 illustrates the conversion of a mesh at one level of a simplification hierarchy to a mesh at the next coarser level of the simplification hierarchy.

FIG. 3 illustrates a simplification step $K^l \rightarrow K^{l-1}$ consisting of removing a maximally independent set of vertices with low outdegree. The level 1 mesh shown on the left in FIG. 3 includes a maximally independent set of vertices marked by heavy dots. It can be seen that the stars of the maximally independent set of vertices do not "tile" (i.e., completely cover) the mesh: triangles $t_1$ and $t_2$ are not part of the star of any of the maximally independent vertices. The level l-1 mesh on the right in FIG. 3 shows the result of removal of the maximally independent set of vertices followed by retriangulation.

To find a set of maximally independent vertices such as that shown in FIG. 3, the above-noted DK algorithm uses a "greedy" approach based only on topological information. An alternative approach in accordance with the invention uses a priority queue based on both geometric and topological information. At the start of each level of the DK algorithm, none of the vertices are marked and the set to be removed is empty. The DK algorithm randomly selects a non-marked vertex of outdegree less than 12, removes it and its star from $K^l$, marks its neighbors as unremovable, and iterates this process until no further vertices can be removed. In a triangulated mesh, the average outdegree of a vertex is 6. Consequently, no more than half of the vertices can be of outdegree 12 or more. Thus it is guaranteed that at least $\frac{1}{24}$ of the vertices will be removed at each level, as described in the above-cited Dobkin and Kirkpatrick reference. In practice, it turns out that one can remove roughly $\frac{1}{4}$ of the vertices, reflecting the fact that the mesh is four-colorable. Given that an approximately constant fraction of vertices can be removed on each level of the simplification hierarchy, the number of levels is on the order of log N and the entire hierarchy can thus be constructed in linear time.

In the above-noted alternative to the DK algorithm, the random selection of vertices is replaced by a priority queue based on geometric information. Roughly speaking, vertices with small and flat 1-ring neighborhoods will be chosen first. At level l, for a vertex $p_i \in P^l$, we consider its 1-ring neighborhood $\phi(|\text{star}(i)|)$ and compute its area a(i) and estimate its curvature κ(i). These quantities are computed relative to $K^l$, the current level. We assign a priority to {i} inversely proportional to a convex combination of relative area and curvature:

$$w(\lambda, i) = \lambda \frac{a(i)}{\max_{p_i \in P^l} a(i)} + (1 - \lambda) \frac{\kappa(i)}{\max_{p_i \in P^l} \kappa(i)}.$$

It has been determined that a value of approximately $\lambda = \frac{1}{2}$ is suitable for use in typical applications. Omitting all vertices of outdegree greater than 12 from the queue still guarantees removal of a constant fraction of vertices. Because of the sort operation implicit in the priority queue, the complexity of building the entire hierarchy increases to on the order of N log N.

Figure 4:
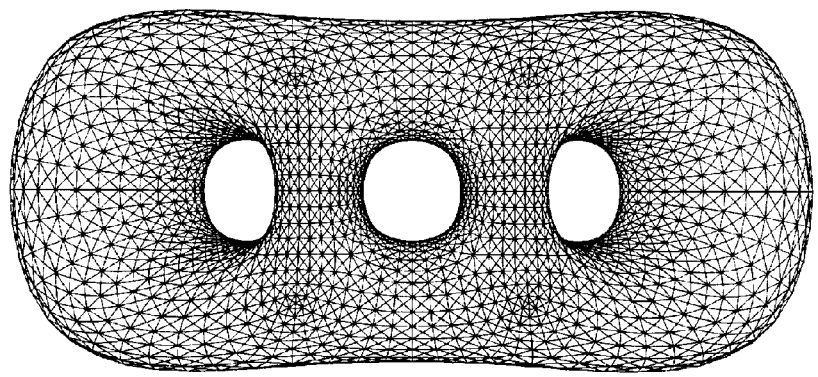
FIG. 4 shows an original mesh, an intermediate mesh and a coarsest mesh in a mesh simplification hierarchy generated for an exemplary three-holed torus surface.
Figure 4:
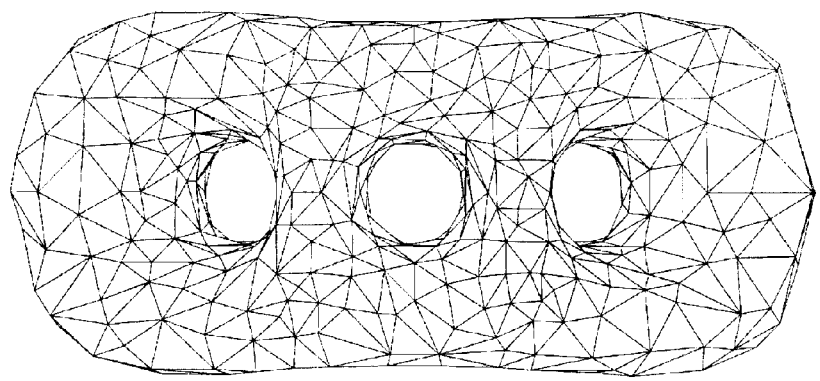
Figure 4:
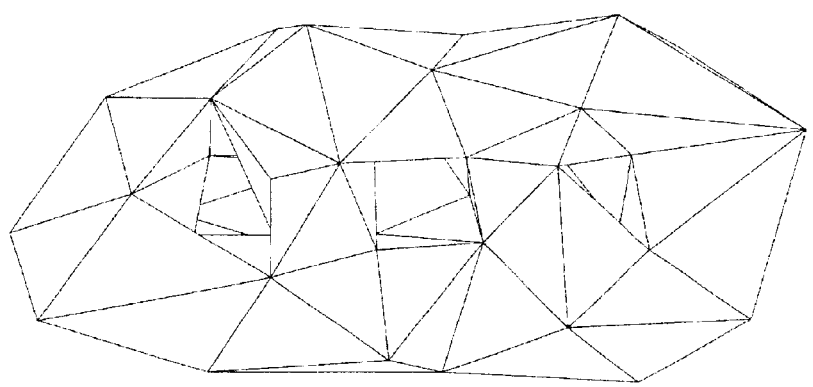

FIG. 4 shows three levels (i.e., original mesh, intermediate mesh, and coarsest mesh) of a mesh hierarchy constructed in accordance with the invention for an exemplary three-holed torus surface. The original mesh $\phi(|K^L|)$ for the three-holed torus surface contained 11776 faces. These were reduced in the mesh simplification hierarchy over 14 levels to 120 faces in the coarsest mesh $\phi(|K^0|)$, implying an average removal of 30% of the faces on a given level. Given that the coarsest mesh is homeomorphic to the original mesh, the coarsest mesh can be used as the base domain of a parameterization of the corresponding surface. Techniques for constructing a mapping Π from the original mesh $\phi(|K^L|)$ to the base domain $\phi(|K^0|)$ will be described in greater detail below.

Flattening and Retriangulation

The flattening and retriangulation aspects of the mesh simplification process will now be described in greater detail. To find $K^{l-1}$, we need to retriangulate the holes left by removing the independent set of vertices. One possibility is to find a plane into which to project the 1-ring neighborhood $\phi(|\text{star}(i)|)$ of a removed vertex $\phi(|i|)$ without overlapping triangles and then retriangulate the hole in that plane. However, finding such a plane, which may not even exist, can be computationally expensive and generally involves linear programming, as described in J. Cohen et al., "Simplifying polygonal models using successive mappings," in Proceedings of IEEE Visualization '97, pp. 395–402, October 1997. Instead, we use the conformal map $z^a$ which minimizes metric distortion to map the neighborhood of a removed vertex into the plane. Let {i} be a vertex to be removed. Enumerate cyclically the $K_i$ vertices in the 1-ring neighborhood N(i)={$j_k$|$1 \leq k \leq K_i$}∈K} such that {$j_{k-1}$, i, $j_k$} E with $K^l$ with $j_0 = j_{K_i}$. A piecewise linear approximation of $z^a$, which we denote by $\mu_i$, is defined by its values for the center point and 1-ring neighbors; namely, $\mu_i(p_i) = 0$ and $$\mu_i(p_{j_k}) = r_k^a \exp(i\theta_k a), \text{ where } r_k = \|p_i - p_{j_k}\|,$$

$$\theta_k = \sum_{l=1}^{k} \angle(p_{j_{l-1}}, p_i, p_{j_l}), \text{ and } a = 2\pi/\theta_{K_i}.$$

The advantages of the conformal map are numerous: it always exists, it is easy to compute, it minimizes metric distortion, and it is a bisection and thus never maps two triangles on top of each other. Once the 1-ring is flattened, we can retriangulate the hole using, for example, a constrained Delauny triangulation (CDT), as described in A. Klein et al., "Vertex-based Delaunay triangulation of meshes of arbitrary topological type," Tech. Rep., University of Washington, July 1997.

Figure 5:
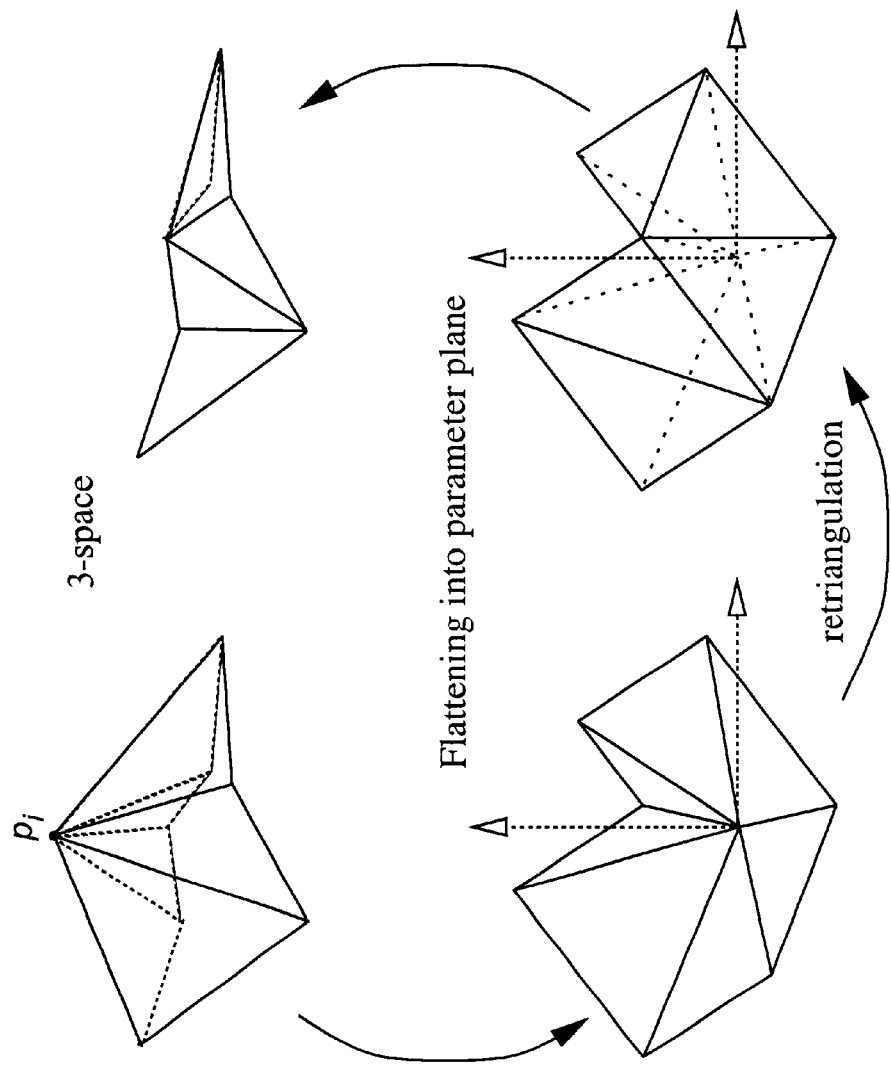
FIG. 5 illustrates vertex removal and retriangulation in an exemplary mesh.

FIG. 5 illustrates the above-described process for building $K^{l-1}$. In order to remove a vertex $p_i$, its star is mapped from three-dimensional space (i.e., 3-space) to a plane using the map $z^a$. The corresponding central vertex is then removed in the plane, and the resulting hole is retriangulated in the plane. The resulting mesh is then mapped back into 3-space as shown. When the vertex to be removed is a boundary vertex, we map to a half disk by setting $$a = \pi/\theta_{K_i}$$

assuming $j_1$ and $j_{Ki}$ are boundary vertices and setting $\theta_1 = 0$. Retriangulation in this illustrative embodiment may be performed with a CDT, or with any other suitable technique.

Initial Parameterization

The process of finding an initial parameterization for the original mesh will now be described in greater detail. To find this initial parameterization, we begin by constructing a mapping Π from $\phi(|K^L|)$ to $\phi(|K^0|)$. The parameterization of the original mesh over the base domain follows from $\Pi^{-1} \phi$ ($|K^0|$). In other words, the mapping of a point $p \in \phi(|K^L|)$ through $\Pi$ is a point $p^0 = \Pi(v) \in \phi(|K^0|)$, which can be written as $$p^0 = \alpha p_i + \beta p_j + \gamma p_k,$$

where $\{i,j,k\} \in K^0$ is a face of the base domain and $\alpha$, $\beta$ and $\gamma$ are barycentric coordinates, i.e., $\alpha + \beta + \gamma = 1$.

Figure 6:
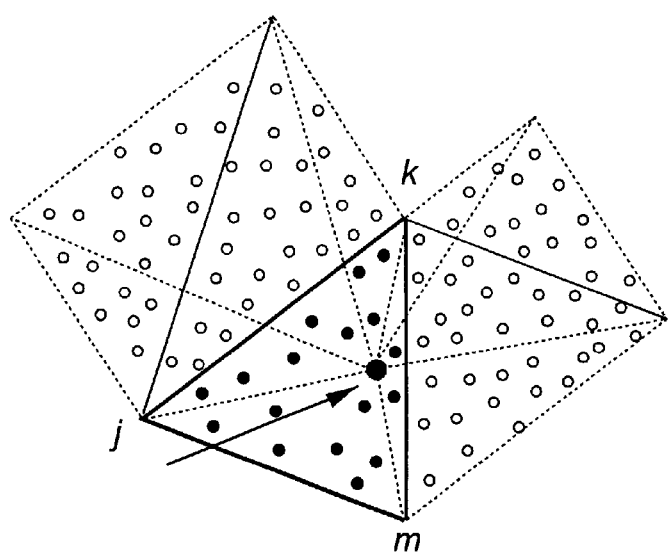
FIG. 6 illustrates the manner in which barycentric coordinates are assigned after removal of a vertex in accordance with the invention.
Figure 7:
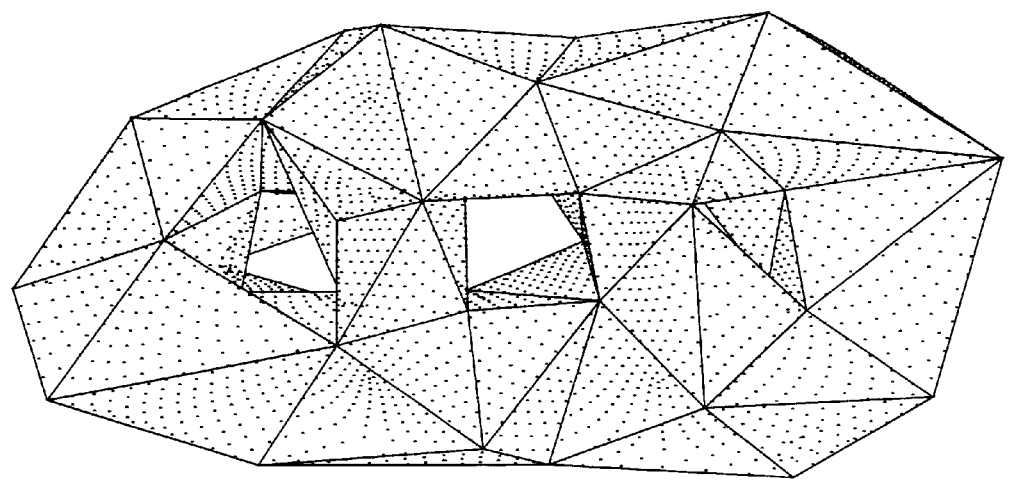
FIG. 7 illustrates a base domain, and the corresponding mapping of mesh data points, generated for a mesh representative of an exemplary three-holed torus surface.

FIG. 7 illustrates an example of such a mapping $\Pi$ onto a base domain $\phi(|K^0|)$. Each point $p_i$ of the original three-holed torus mesh $\phi(|K^L|)$ is mapped to a triangle on the coarsest level of the hierarchy, i.e., to a triangle on the base domain $\phi(|K^0|)$. The mapping of each of these points is illustrated as a dot on the base domain in FIG. 7. It will be shown below that such a mapping can be computed concurrently with the hierarchy construction. The basic idea is to successively compute piecewise linear bijections $\Pi^l$ between $\phi(|K^L|)$ and $\phi(|K^l|)$ starting with $\Pi^L$, which is the identity, and ending with $\Pi^0 = \Pi$. These piecewise linear bijections are an example of what are also referred to herein as sub-functions of a mapping function. Notice that in this example we only need to compute the value of $\Pi^l$ at the vertices of $K^L$. At any other point it follows from piecewise linearity. Assume we are given $\Pi^l$ and want to compute $\Pi^{l-1}$. Each vertex $\{i\} \in K^L$ falls into one of the following categories:

1. $\{i\} \in K^{l-1}$: The vertex is not removed on level l and survives on level l−1. In this case nothing needs to be done. $\Pi^{l-1}(p_i) = \Pi^l(p_i) = p_i$.
2. $\{i\} \in K^l \backslash K^{l-1}$: The vertex gets removed when going from l to l−1. Consider the flattening of the 1-ring around $p_i$ as illustrated in FIG. 5. After retriangulation, the origin lies in a triangle which corresponds to some face $t = \{j, k, m\} \in K^{l-1}$ as shown in FIG. 6 and has barycentric coordinates $(\alpha, \beta, \gamma)$ with respect to the vertices of that face, i.e., $\alpha \mu_i(p_j) + \beta \mu_i(p_k) + \gamma \mu_i(p_m)$. In that case, let $\Pi^{l-1}(p_i) = \alpha p_j + \beta p_k + \gamma p_m$.
3. $\{i\} \in K^L \backslash K^l$: The vertex was removed earlier, thus $\Pi^l(p_i) = \alpha' p_{j'} + \beta' p_{k'} + \gamma' p_{m'}$ for some face $t' = \{j', k', m'\} \in K^l$. If $t' \in K^{l-1}$, nothing needs to be done; otherwise, the independent set guarantees that exactly one vertex of t' is removed, say $\{j'\}$. Consider the conformal map $\mu_{j'}$ (FIG. 6). After retriangulation, the $\mu_{j'}(p_i)$ lies in a triangle which corresponds to some face $t = \{j, k, m\} \in K^{l-1}$ with barycentric coordinates $(\alpha, \beta, \gamma)$ (shown as black dots within the highlighted face in FIG. 6). In that case, let $\Pi_{l-1}(p_i) = \alpha p_j + \beta p_k + \gamma p_m$ (i.e., all vertices in FIG. 6 are reparameterized in this way).

The just-removed vertices from a given mesh level thus get assigned barycentric coordinates with respect to the containing triangle on the next coarser level. Similarly, all the finest level (i.e., original mesh) vertices that were mapped to a triangle of the hole now need to be reassigned to a triangle of the next coarser level. The above-described illustrative algorithm on every level sweeps through all the vertices of the finest level, resulting in an overall complexity on the order of N log N. However, other embodiments of the invention need not sweep through all vertices of the finest level in this manner. For example, alternative embodiments based on the DK algorithm, progressive meshes (PM) or other mesh simplification approaches may select subsets of vertices for processing at each level.

Figure 8:
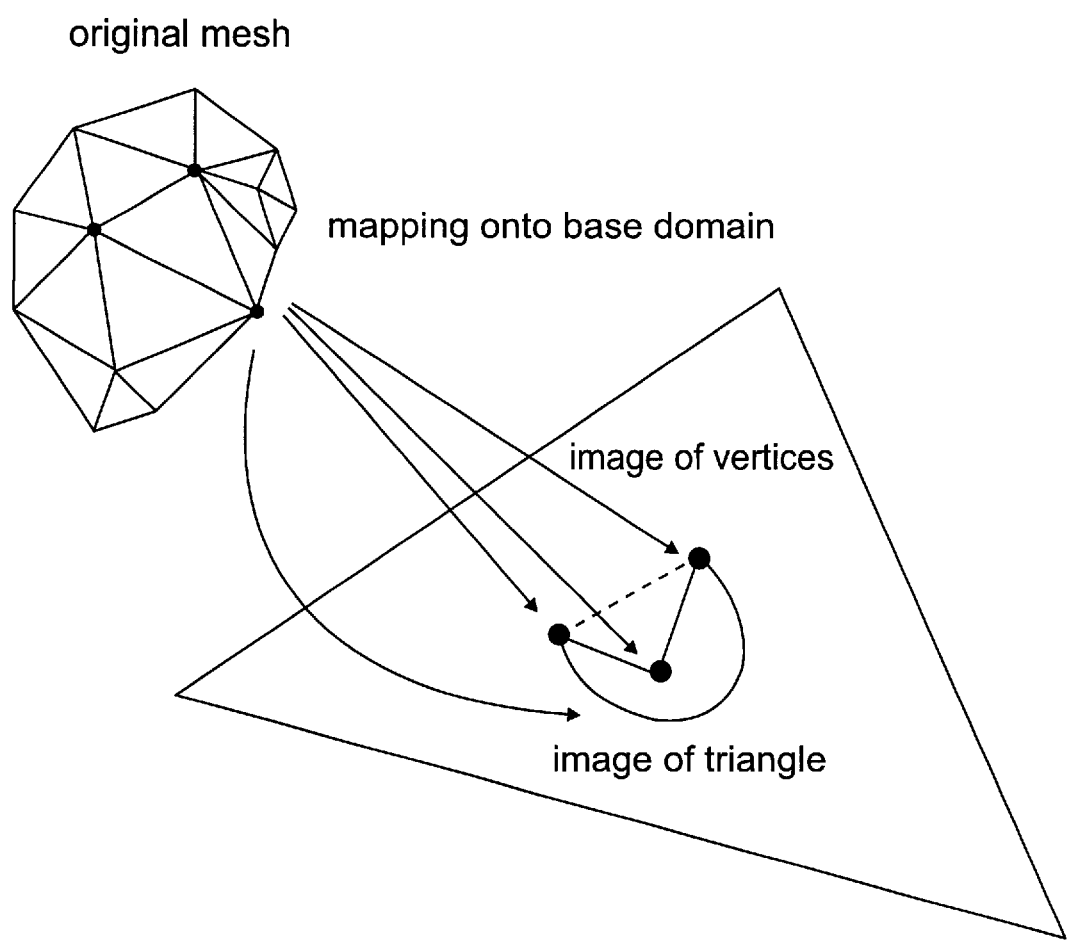
FIG. 8 shows a mapping from an original mesh to a base domain triangle, illustrating a case in which a triangle is flipped.

It should be noted that given that every association between a 1-ring and its retriangulated hole in this embodiment is a bijection, so is the mapping $\Pi$. However, $\Pi$ does not necessarily map a finest level triangle to a triangular region in the base domain. Instead, the image of a triangle may be a non-convex region. In that case connecting the mapped vertices with straight lines can cause flipping, i.e., triangles may end up on top of each other. This situation is illustrated in FIG. 8, in which three vertices of the original mesh get mapped to a concave configuration on the base domain, causing the piecewise linear approximation of the mapping to flip the triangle as shown. There are a number of methods for dealing with this potential problem. For example, one could further subdivide the original mesh in the problem regions. Given that the underlying continuous map is a bijection, this is guaranteed to fix the problem. An alternative is to use a brute force triangle unflipping mechanism. One could, for example, adjust the parameter values of every vertex whose 2-neighborhood contains a flipped triangle, by replacing them with the averaged parameter values of its 1-ring neighbors.

Tagging and Feature Lines

In the illustrative embodiment as described so far, there is no a priori control over which vertices end up in the base domain or how they will be connected. However, often there are features of the original mesh which one wants to preserve in the base domain. These features can either be detected automatically or specified by the user. We consider as examples two types of features on the original mesh: vertices and paths of edges. Guaranteeing that a certain vertex of the original mesh ends up in the base domain is straightforward. Simply mark that vertex as unremovable throughout the simplification hierarchy.

We now describe a technique which can guarantee that a certain path of edges on the original mesh gets mapped to an edge of the base domain. Let $\{v_i | 1 \leq i \leq I\} \subset K^L$ be a set of vertices on the finest level which form a path, i.e., $\{v_i, v_{i+1}\}$ is an edge. Tag all the edges in the path as feature edges. First tag $v_1$ and $v_I$, so-called dart points, as unremovable so they are guaranteed to end up in or the base domain. Let $v_i$ be the first vertex on the interior of the path which gets marked for removal in the hierarchy, say, when going from level l to level l−1. Because of the independent set property, $v_{i-1}$ and $v_{i+1}$ cannot be removed and therefore must belong to $K^{l-1}$. When flattening the hole around $v_i$, tagged edges are treated like a boundary. We first straighten out the edges $\{v_{i-1}, v_i\}$ and $\{v_i, v_{i+1}\}$ along the x-axis, and use two boundary type conformal maps to the half disk above and below. When retriangulating the hole around $v_i$, we put the edge $\{v_{i-1}, v_{i+1}\}$ in $K^{l-1}$, tag it as a feature edge, and compute a CDT on the upper and lower parts.

Figure 9:
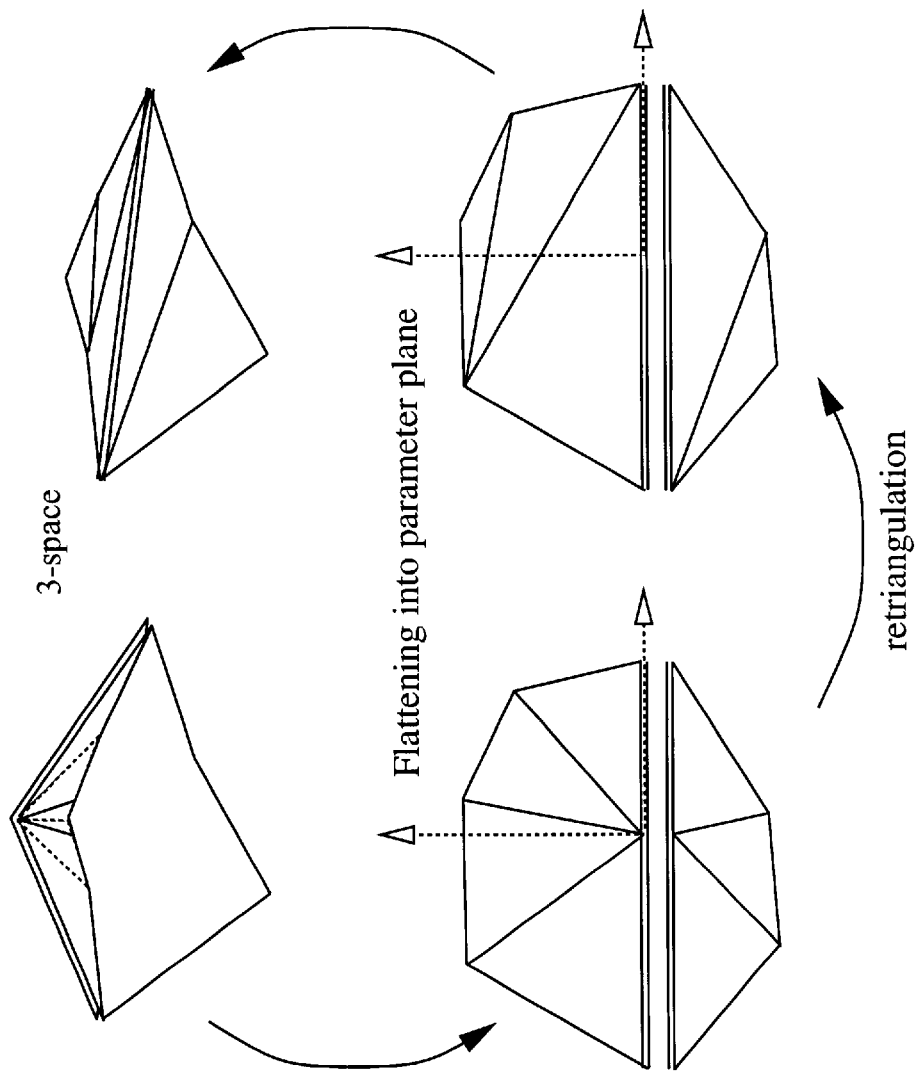
FIG. 9 illustrates retriangulation after removal of a vertex with two incident feature edges.

This process is illustrated in FIG. 9, and ensures that when a vertex with two incident feature edges is removed, the subsequent retriangulation adds a new feature edge to replace the two old ones. If we apply similar procedures on coarser levels, we ensure that $v_1$ and $v_I$ remain connected by a path (potentially a single edge) on the base domain. This guarantees that $\Pi$ maps the curved feature path onto the coarsest level edge(s) between $v_1$ and $v_I$. In general, there may be multiple feature paths which may be closed or cross each other. As usual, a vertex with more than two incident feature edges is considered a corner, and marked as unremovable. The above-described feature vertices and paths can be provided by the user or detected automatically. As an example of the latter case, we could consider every edge whose dihedral angle is below a certain threshold to be a feature edge, and every vertex whose curvature is above a certain threshold to be a feature vertex.

Before describing remeshing in greater detail, it may be helpful to summarize the illustrative embodiment of the invention as described to this point. We have established an initial bijection $\Pi$ of the original surface $\phi(|K^L|)$ onto a base domain $\phi(|K^0|)$ consisting of a small number of triangles (e.g., FIG. 7). We use a simplification hierarchy (FIG. 4) in which the holes after vertex removal are flattened and retriangulated (FIGS. 5 and 9). Original mesh points get successively reparameterized over coarser triangulations (FIG. 9). The resulting mapping in this embodiment is always a bisection; triangle flipping (FIG. 8) is possible but can be corrected in the manner previously described.

We will now consider uniform remeshing using subdivision connectivity triangulations since it is both a convenient way to illustrate the properties of a parameterization and is an important subject in its own right. In the process, we compute a smoothed version of the above-described initial parameterization. We also show how to efficiently construct an adaptive remeshing with guaranteed error bounds.

Uniform Remeshing

Since the mapping $\Pi$ in the illustrative embodiment is a bijection, we can use $\Pi^{-1}$ to map the base domain to the original mesh. We follow a strategy similar to that used in the above-cited M. Eck at al. reference: regularly (e.g., 1:4) subdivide the base domain and use the inverse map to obtain a regular connectivity remeshing. This introduces a hierarchy of regular meshes $(Q^m, R^m)$ ($Q^m$ is the point set and $R^m$ is the complex) obtained from m-fold midpoint subdivision of the base domain $(P^0, K^0)=(Q^0, R^0)$. Midpoint subdivision implies that all new domain points lie in the base domain, $Q^m \subset \phi(|R^0|)$ and $|R^m|=|R^0|$. All vertices of $R^m \backslash R^0$ have outdegree 6. The uniform remeshing of the original mesh on level m is given by $(\Pi^{-1}(Q^m), R^m)$.

We thus need to compute $\Pi^{-1}(q)$ where q is a point in the base domain with dyadic barycentric coordinates. In particular, we need to compute which triangle of $\phi(|K^L|)$ contains $\Pi^{-1}(q)$, or, equivalently, which triangle of $\Pi(\phi(|K^L|))$ contains q. This is a standard point location problem in an irregular triangulation, and may be solved using the point location algorithm described in P. J. C. Brown and C. T. Faigle, "A robust efficient algorithm for point location in triangulations," Tech. Rep., Cambridge University, February 1997. This approach avoids looping that can occur with non-Delaunay meshes, as described in M. Garland and P. S. Heckbert, "Fast polygonal approximation of terrains and height fields," Tech. Rep. CMU-CS-95-181, CS Dept., Carnegie Mellon U., September 1995, and L. Guibas and J. Stolfi, "Primitives for the Manipulation of General Subdivisions and the Computation of Voronoi Diagrams," ACM Transactions on Graphics 4, 2 pp. 74–123, April 1985. Once we have found the triangle {i,j,k} which contains q, we can write q as follows $$q=\alpha\Pi(p_i)+\beta\Pi(p_j)+\gamma\Pi(p_k),$$

and thus $$\Pi^{-1}q=\alpha p_i+\beta p_j \in \phi(|K^L|).$$

Figure 10:
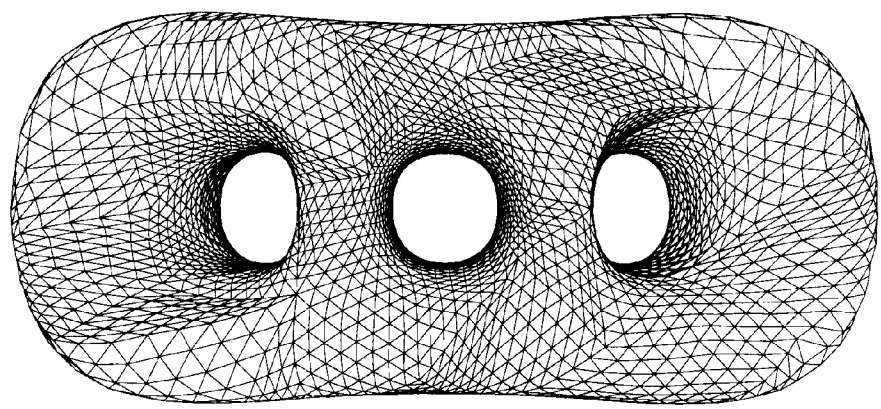
FIGS. 10 and 11 show remeshings of a three-holed torus surface, without smoothing and with smoothing, respectively.

FIG. 10 illustrates the result of this midpoint subdivision procedure as applied to a level 3 uniform remeshing of a three-holed torus using the $\Pi^{-1}$ mapping. The parameterization in this example is smooth within each base domain triangle, but not across base domain triangles.

It should be noted with regard to the complexity of the above-described uniform remeshing that the point location algorithm may be characterized as a "walk" on the finest level mesh with complexity on the order of the square root of N. Hierarchical point location algorithms with asymptotic complexity on the order of log N exist, but generally have a much larger constant, as described in, for example, D. Kirkpatrick, "Optimal search in planar subdivisions," SIAM J. Comput. 12, pp. 28–35, 1983. Given that the above-described illustrative embodiment schedules the queries in a systematic order, there is often an excellent starting guess and a constant number of steps. The finest level "walking" algorithm has been observed to provide better performance than the hierarchical point location algorithms for meshes with up to 100,000 faces.

Smoothing the Parameterization

It is clear from the example of FIG. 10 that the mapping used in the illustrative embodiment is generally not smooth across global (i.e., base domain) edges. One way to obtain global smoothness is to consider a mapping that minimizes a global smoothness functional and goes from $\phi(|K^L|)$ to $|K^0|$ rather than to $\phi(|K^0|)$. This would generally require an iterative solver. However, we have determined that computation of mappings to topological realizations in a high dimensional space can be needlessly cumbersome. The present invention therefore instead provides a much simpler and cheaper smoothing technique based on Loop subdivision as described in, for example, C. Loop, "Smooth subdivision surfaces based on triangles," Master's Thesis, University of Utah, Department of Mathematics, 1987.

The basic idea of this smoothing technique in accordance with the invention is to compute $\Pi^{-1}$ at a smoothed version of the dyadic points, rather then at the dyadic points themselves (which can equivalently be viewed as changing the parameterization). To that end, we define a map L from the base domain to itself by the following modification of Loop subdivision: (1) If all the points of a stencil needed for computing either a new point or smoothing an old point are inside the same triangle of the base domain, we can simply apply the Loop weights and the new points will be in that same face; (2) If the stencil stretches across two faces of the base domain, we flatten them out using a "hinge" map at their common edge. We then compute the point's position in this flattened domain and extract the triangle in which the point lies, together with its barycentric coordinates; and (3) If the stencil stretches across multiple faces, we use the conformal flattening strategy described previously. Note that the modifications to Loop subdivision force L to map the base domain onto the base domain. The composite map $\Pi^{-1} \circ L$ is a smoothed parameterization that maps the base domain onto the original surface. The m-th level of uniform remeshing with the smoothed parameterization is given by $(\Pi^{-1} \circ L(Q^m), R^m)$, where $Q^m$, as before, are the dyadic points on the base domain.

Figure 11:
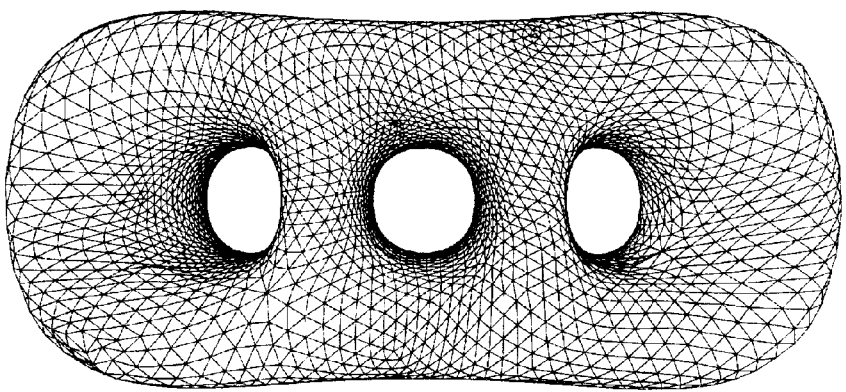

FIG. 11 illustrates the result of applying the above-described smoothing procedure to the three-holed torus example. The mesh shown in FIG. 11 is a level 3 uniform remesh using the smoothed parameterization. The remesh used 4 levels of uniform subdivision for a total of 30720 triangles. Because the Loop subdivision process in this embodiment only enters into smoothing the parameterization, the mesh shown in FIG. 11 is still a sampling of the original mesh, rather than a Loop surface approximation of the original mesh.

The original sampled geometry of the three-holed torus is smooth and did not involve any feature constraints. It should be noted that when the mesh is tagged in order to preserve features of the original mesh, we generally cannot apply smoothing across the tagged edges since this would break the alignment with the features. Instead, we could use other modified versions of Loop subdivision which can deal with corners, dart points and feature edges, such as those shown in the surface illustrated in FIGS. 12A–12F. Details regarding these modified versions of Loop subdivision can be found in, for example, H. Hoppe et al., "Piecewise smooth surface reconstruction," in Computer Graphics (SIGGRAPH '94 Proceedings), pp. 295–302, 1994.

Adaptive Remeshing

One of the advantages of meshes with regular subdivision connectivity is that classical multiresolution and wavelet algorithms can be employed in processing such meshes. The standard wavelet algorithms used, e.g., in image compression, generally start from the finest level, compute the wavelet transform, and then obtain an efficient representation by discarding small wavelet coefficients. This conventional approach is followed in the above-cited Eck et al. reference, as well as in M. Eck and H. Hoppe, "Automatic reconstruction of b-spline surfaces of arbitrary topological type," in Computer Graphics (SIGGRAPH '96 Proceedings), pp. 325–334, 1996; and A. Certain et al., "Interactive multiresolution surface viewing," in Computer Graphics (SIGGRAPH '96 Proceedings), pp. 91–98, 1996. These and other conventional approaches generally remesh using uniform subdivision followed by sparsification through wavelet thresholding. As previously noted, this has the drawback that in order to resolve a small local feature on the original mesh, one may need to subdivide to a very fine level. Each extra level of subdivision quadruples the number of triangles, most of which will later be discarded using the wavelet thresholding procedure.

The present invention provides an adaptive remeshing algorithm which avoids the need for uniform subdividing by immediately building an adaptive mesh with a guaranteed conservative error bound. This is possible because the mesh simplification hierarchy contains the information on how much subdivision is needed in any given area. Essentially, we let the irregular simplification hierarchy "drive" the adaptive construction of a regular connectivity mesh. We first compute for each triangle in the base domain the following error value:

$$E(t) = \max_{p_i \in P^L \text{ and } \pi(p_i) \in \varphi(|t|)} \text{dist}(p_i, \varphi(|t|)).$$

This measures the distance between one triangle in the base domain and the vertices of the finest level which are mapped to that triangle. The adaptive algorithm then proceeds as follows. Set a certain relative error threshold $\epsilon$. Compute $E(t)$ for all triangles of the base domain. If $E(t)/B$ is greater than $\epsilon$, where $B$ is the largest side of the bounding box, subdivide the domain triangle using the Loop-based procedure given above. Next, we need to reassign vertices to the triangles of level m=1. This is done as follows: For each point $p_i \in P^L$ consider the triangle t of $K_0$ to which it is currently assigned. Next consider the four children of t on level 1, $t_j$ with j=0, 1, 2, 3 and compute the distance between $p_i$ and each of the $\phi(|t_j|)$. Assign $p_i$ to the closest child. Once the finest level vertices have been reassigned to level 1 triangles, the error values for those triangles can be computed. Now iterate this procedure until all triangles have an error value below the threshold. Because all error values are computed from the finest level in this embodiment, we are guaranteed to resolve all features within the error bound. Note that we are not computing the true distance between the original vertices and a given approximation, but rather an easy-to-compute upper bound for the true distance.

In order to be able to compute the Loop smoothing mapping L on an adaptively subdivided mesh, the mesh needs to satisfy a vertex restriction criterion, i.e., if a vertex has a triangle incident to it with depth i, then it must have a complete 1-ring at level i–1, as described in D. Zorin et al., "Interactive multiresolution mesh editing," in Computer Graphics (SIGGRAPH '97 Proceedings) pp. 259–268, 1997. This restriction may necessitate subdividing some triangles even if they are below the error threshold.

FANDISK EXAMPLE

Figure 12C:
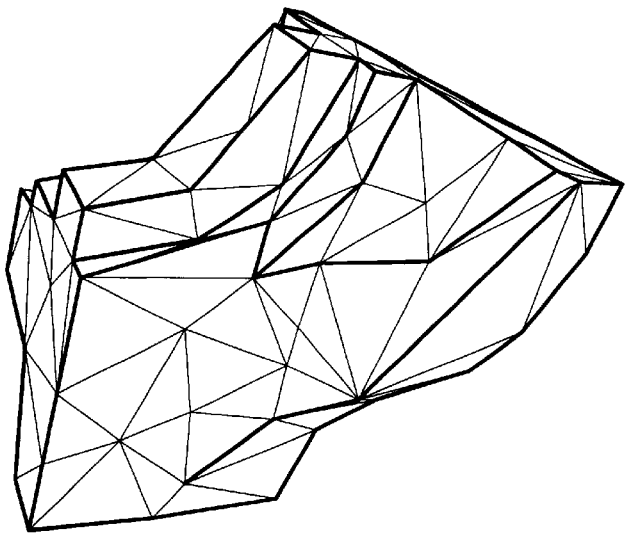
FIGS. 12A–12F show meshes representative of an exemplary fandisk surface, generated using the techniques of the invention.
Figure 12B:
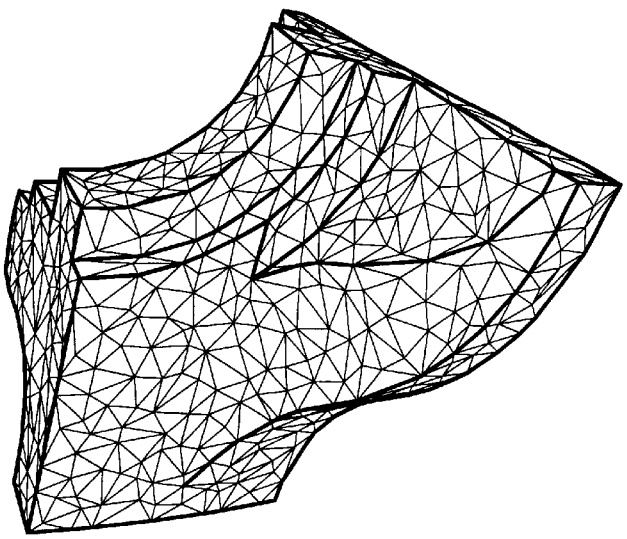
Figure 12A:
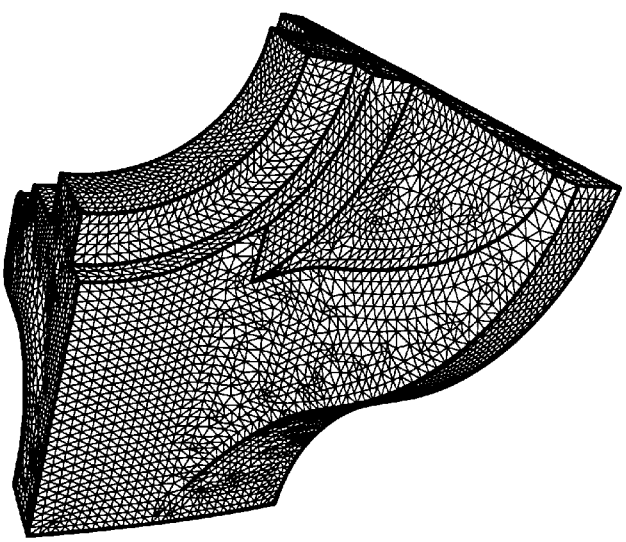
Figure 12F:
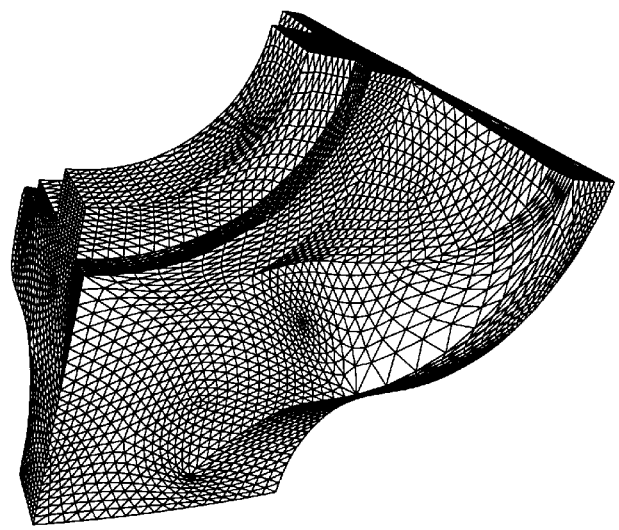
Figure 12E:
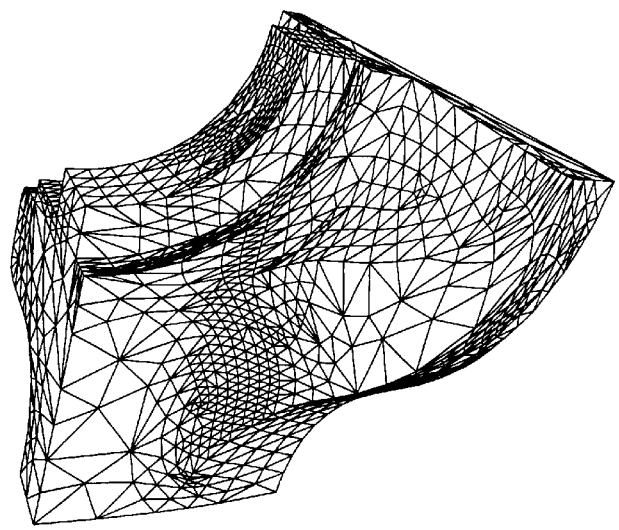
Figure 12D:
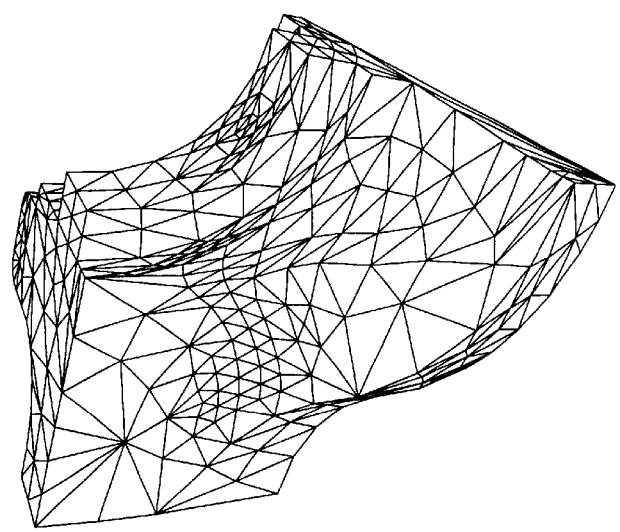

The above-described techniques were applied to a "fandisk" mesh as shown in FIG. 12A. The original mesh of FIG. 12A contains 12,946 triangles which were reduced to 168 faces in the base domain of FIG. 12C over 15 levels (25% average face removal per level) using steps 12, 14 and 16 of the FIG. 1A algorithm. The original mesh had all edges with dihedral angles below 75° tagged (1487 edges), resulting in 141 tagged edges at the coarsest level. It can be seen that feature edges, darts and corner vertices from the original mesh of FIG. 12A are preserved in the base domain of FIG. 12C. Adaptive remeshing to within specified error bounds of $\epsilon$=5% and $\epsilon$=1% (i.e., percent of longest bounding box side) results in the meshes shown in FIGS. 12D and 12E, which include 1120 and 3430 triangles, respectively. The mesh of FIG. 12F shows a uniform remeshing to level 3 of the mesh hierarchy, in effect showing iso-parameter lines of the parameterization used for remeshing. Note how the iso-parameter lines in FIG. 12F conform perfectly to the initially tagged features of the original mesh of FIG. 12A.

Conclusion

The embodiments of the invention described above can generate smooth parameterizations for irregular connectivity meshes of arbitrary topology. A multi-level mesh hierarchy construction is used to simplify the original mesh and piecewise linear approximations of conformal mappings are used to incrementally build a parameterization of the original mesh over a low face count base domain. This parameterization is further improved through a hierarchical smoothing procedure which is based on Loop smoothing in parameter space. The resulting parameterizations are of high quality, and their utility has been demonstrated in an adaptive, subdivision connectivity remeshing technique that has guaranteed error bounds. The meshes satisfy the requirements of multiresolution representations which generalize classical wavelet representations and are thus suitable for use in applications such as multiresolution editing and compression. Using edge and vertex constraints, the parameterizations can be forced to respect feature lines of interest without the complexities associated with uniform subdivision followed by sparsification.

The above-described embodiments of the invention are intended to be illustrative only. For example, although remeshing is used herein as the primary application to demonstrate the usefulness of the parameterizations, the techniques of the invention may be utilized in many other applications, including, for example, multiresolution editing, texture mapping, morphing and numerical analysis algorithms such as fast multigrid solvers. Moreover, the invention can be implemented using any of a number of other mesh simplification approaches, including the above-noted PM simplification. These and numerous other alternative embodiments within the scope of the following claims will be apparent to those skilled in the art.

What is claimed is:

1. A method of processing a set of data points in the form of a first geometric mesh representative of a surface, the method comprising the steps of:
processing the data points to generate a plurality of progressively coarser meshes including a base domain mesh, such that the first mesh and each of the progressively coarser meshes each correspond to a different level of coarseness; and
generating a mapping function in the form of a bijection which maps at least a subset of the data points from the first mesh to the base domain mesh, wherein the mapping function is generated as a combination of a plurality of sub-functions, each of which relates data points in a mesh of a given level of coarseness to data points in a mesh of the next coarser level.

2. The method of claim 1 wherein each of the meshes is a triangular mesh comprising a plurality of triangles having vertices corresponding to data points.

3. The method of claim 1 wherein the mapping function and at least a subset of the sub-functions each comprise a bijection.

4. The method of claim 1 wherein the step of generating the mapping function further includes the step of generating a given one of the sub-functions by removing data points in a mesh of a given level of coarseness and assigning barycentric coordinates to the removed points based on data points remaining in the mesh of the next coarser level.

5. The method of claim 1 further including the step of specifying a subset of the data points in the first mesh which are to be preserved in the base domain mesh.

6. The method of claim 1 further including the step of applying a smoothing process to the mapping function.

7. The method of claim 1 wherein the first mesh has an irregular connectivity, and the method further includes the step of utilizing the base domain and the mapping function to generate a mesh having a regular connectivity.

8. The method of claim 7 further including the step of utilizing a midpoint subdivision process to determine data points in the regular connectivity mesh.

9. The method of claim 1 further including the step of utilizing the base domain and the mapping function to generate an adaptive mesh representative of the first mesh.

10. The method of claim 9 wherein the step of utilizing the base domain and the mapping function to generate an adaptive mesh further includes the steps of:
computing an error value for each of a plurality of geometric shapes in a current stage of retriangulation;
subdividing a given geometric shape in the current stage if its error value is not below a threshold; and
repeating the computing and subdividing steps for additional stages of retriangulation until each of a plurality of geometric shapes in the adaptive mesh has an error value below the threshold.

11. An apparatus for processing a set of data points in the form of a first geometric mesh representative of a surface, the apparatus comprising:
a memory for storing at least a portion of first mesh; and
at least one processor operative (i) to process the data points to generate a plurality of progressively coarser meshes including a base domain mesh, such that the first mesh and each of the progressively coarser meshes each correspond to a different level of coarseness; and (ii) to generate a mapping function in the form of a bijection which maps at least a subset of the data points from the first mesh to the base domain mesh; wherein the mapping function is generated as a combination of a plurality of sub-functions, each of which relates data points in a mesh of a given level of coarseness to data points in a mesh of the ext coarser level.

12. The apparatus of claim 11 wherein each of the meshes is a triangular mesh comprising a plurality of triangles having vertices corresponding to data points.

13. The apparatus of claim 11 wherein the mapping function and at least a subset of the sub-functions each comprise a bijection.

14. The apparatus of claim 11 wherein the processor is further operative to generate a given one of the sub-functions by removing data points in a mesh of a given level of coarseness and assigning barycentric coordinates to the removed points based on data points remaining in the mesh of the next coarser level.

15. The apparatus of claim 11 wherein a subset of the data points in the first mesh are specified to be preserved in the base domain mesh.

16. The apparatus of claim 11 wherein the processor is further operative to apply a smoothing process to the mapping function.

17. The apparatus of claim 11 wherein the first mesh has an irregular connectivity, and the processor is further operative to utilize the base domain and the mapping function to generate a mesh having a regular connectivity.

18. The apparatus of claim 17 wherein the processor is further operative to utilize a midpoint subdivision process to determine data points in the regular connectivity mesh.

19. The apparatus of claim 11 wherein the processor is further operative to utilize the base domain and the mapping function to generate an adaptive mesh representative of the first mesh.

20. The apparatus of claim 19 wherein the processor is further operative (i) to compute an error value for each of a plurality of geometric shapes in a current stage of retriangulation; (ii) to subdivide a given geometric shape in the current stage if its error value is not below a threshold; and (iii) to repeat the computing and subdividing operations for additional stages of retriangulation until each of a plurality of geometric shapes in the adaptive mesh has an error value below the threshold.

21. A method of processing a set of data points in the form of a first geometric mesh representative of a surface, the method comprising the steps of:
processing the data points to generate a plurality of progressively coarser meshes including a base domain mesh, such that the first mesh and each of the progressively coarser meshes each correspond to a different level of coarseness; and
generating a mapping function which maps at least a subset of the data points from the first mesh to the base domain mesh, wherein the mapping function is generated as a combination of a plurality of sub-functions, each of which relates data points in a mesh of a given level of coarseness to data points in a mesh of the next coarser level, and further wherein a given one of the sub-functions is generated by removing data points in a mesh of a given level of coarseness and assigning barycentric coordinates to the removed points based on data points remaining in the mesh of the next coarser level.

22. An apparatus for processing a set of data points in the form of a first geometric mesh representative of a surface, the apparatus comprising:
a memory for storing at least a portion of first mesh; and
at least one processor operative (i) to process the data points to generate a plurality of progressively coarser meshes including a base domain mesh, such that the first mesh and each of the progressively coarser meshes each correspond to a different level of coarseness; and (ii) to generate a mapping function which maps at least a subset of the data points from the first mesh to the base domain mesh; wherein the mapping function is generated as a combination of a plurality of sub-functions, each of which relates data points in a mesh of a given level of coarseness to data points in a mesh of the next coarser level, and a given one of the sub-functions is generated by removing data points in a mesh of a given level of coarseness and assigning barycentric coordinates to the removed points based on data points remaining in the mesh of the next coarser level.—

23. An article of manufacture comprising a computer-readable storage medium for storing one or more software programs for processing a set of data points in the form of a first geometric mesh representative of a surface, wherein the one or more software programs when executed by a processor implement the steps of:

processing the data points to generate a plurality of progressively coarser meshes including a base domain mesh, such that the first mesh and each of the progressively coarser meshes each correspond to a different level of coarseness; and generating a mapping function which maps at least a subset of the data points from the first mesh to the base domain mesh, wherein the mapping function is generated as a combination of a plurality of sub-functions, each of which relates data points in a mesh of a given level of coarseness to data points in a mesh of the next coarser level, and further wherein a given one of the sub-functions is generated by removing data points in a mesh of a given level of coarseness and assigning barycentric coordinates to the removed points based on data points remaining in the mesh of the next coarser level.

24. An article of manufacture comprising a computer-readable storage medium for storing one or more software programs for processing a set of data points in the form of a first geometric mesh representative of a surface, wherein the one or more software programs when executed by a processor implement the steps of:

processing the data points to generate a plurality of progressively coarser meshes including a base domain mesh, such that the first mesh and each of the progressively coarser meshes each correspond to a different level of coarseness; and generating a mapping function in the form of a bijection which maps at least a subset of the data points from the first mesh to the base domain mesh, wherein the mapping function is generated as a combination of a plurality of sub-functions, each of which relates data points in a mesh of a given level of coarseness to data points in a mesh of the next coarser level.

\* \* \* \* \*

UNITED STATES PATENT AND TRADEMARK OFFICE
CERTIFICATE OF CORRECTION

PATENT NO. : 6,285,372 B1
DATED : September 4, 2001
INVENTOR(S) : Cowsar et al.

It is certified that error appears in the above-identified patent and that said Letters Patent is hereby corrected as shown below:

<u>Title page,</u>
Item [76], please change inventor(s) information to read as follows:

-- Lawrence C. Cowsar, Summit, NJ (US);
David Dobkin, Princeton, NJ (US);
Aaron W.F. Lee, Mountain View, CA (US);
Peter Schröder, Pasadena, CA (US); and
Wim Sweldens, New Providence, NJ (US). --

Please add the Assignee as follows:
-- Item [73], Assignee:
Lucent Technologies Inc., Murray Hill, NJ, State of Delaware;
California Institute of Technology, Pasadena, CA; and
Trustees of Princeton University, Princeton, NJ. --

Signed and Sealed this

Thirtieth Day of July, 2002

*Attest:*

JAMES E. ROGAN
*Attesting Officer*  *Director of the United States Patent and Trademark Office*